United States Patent [19]
Wu

[11] Patent Number: 5,637,980
[45] Date of Patent: Jun. 10, 1997

[54] BATTERY CHARGING/DISCHARGING SWITCHING CONTROL PROTECTIVE CIRCUIT

[76] Inventor: Jimmy Wu, 6F., No. 25-17, Tung Shan St., Hsin Chu, Taiwan

[21] Appl. No.: 436,973

[22] Filed: May 8, 1995

[51] Int. Cl.$^6$ ............................. H01M 10/46; H02J 7/04
[52] U.S. Cl. ................................. 320/9; 320/14; 320/29; 320/31
[58] Field of Search ...................... 320/5, 8, 9, 11, 320/13, 14, 15, 21, 29, 30, 31

[56] References Cited

U.S. PATENT DOCUMENTS

| | | | |
|---|---|---|---|
| 5,307,000 | 4/1994 | Podrazhansky et al. | 320/14 |
| 5,343,138 | 8/1994 | Ainsworth | 320/14 |

*Primary Examiner*—Peter S. Wong
*Assistant Examiner*—Patrick B. Law
*Attorney, Agent, or Firm*—Bacon & Thomas

[57] ABSTRACT

A battery charging/discharging switching control protective circuit including a charging discharging loop, a constant current control circuit connected to the input terminal of the charging discharging loop, a microprocessor control circuit, a time series control circuit with its input terminal connected to the microprocessor control circuit and its output terminal connected to the switch of the charging discharging loop and the switches of the constant current control circuit, the time series control circuit being controlled by the microprocessor control circuit to control the transistor of the charging discharging loop in charging or discharging the battery at a constant current value, and to control the switches of the charging discharging loop in turning off the transistor at the beginning or the end of the charging or discharging operation, so as to prevent the occurrence of electric arc, sparks, transient electric current and voltage during the switching of the switches of the charging discharging loop.

7 Claims, 5 Drawing Sheets

BATTERY CHARGING/DISCHARGING SWITCHING CONTROL PROTECTIVE CIRCUIT

BACKGROUND OF THE INVENTION

The present invention relates to a battery charging/discharging switching control protective circuit which protects the switches of the charging discharging loop to prevent the occurrence of electric arc, sparks, transient electric current and voltage during switching.

Regular battery charging discharging devices tend to produce electric arc, sparks, transient electric current and voltage at the beginning of a charging operation or the end of a discharging operation, causing the switches or other component parts damaged.

SUMMARY OF THE INVENTION

The present invention has been accomplished to provide a protective circuit which eliminates the aforesaid problem. It is one object of the present invention to provide a battery charging discharging switching control protective circuit which does not produce electric arc, sparks, transient electric current and voltage during the switching operation of the charging discharging loop. It is another object of the present invention to provide a battery charging discharging switching control protective circuit which protects the electronic component parts and saves the service cost,

BRIEF DESCRIPTION OF THE DRAWINGS

The present invention will now be described by way of example, with referenced to the annexed drawings, in which.

DETAILED DESCRIPTION OF THE PREFERRED EMBODIMENT

Figure 1:
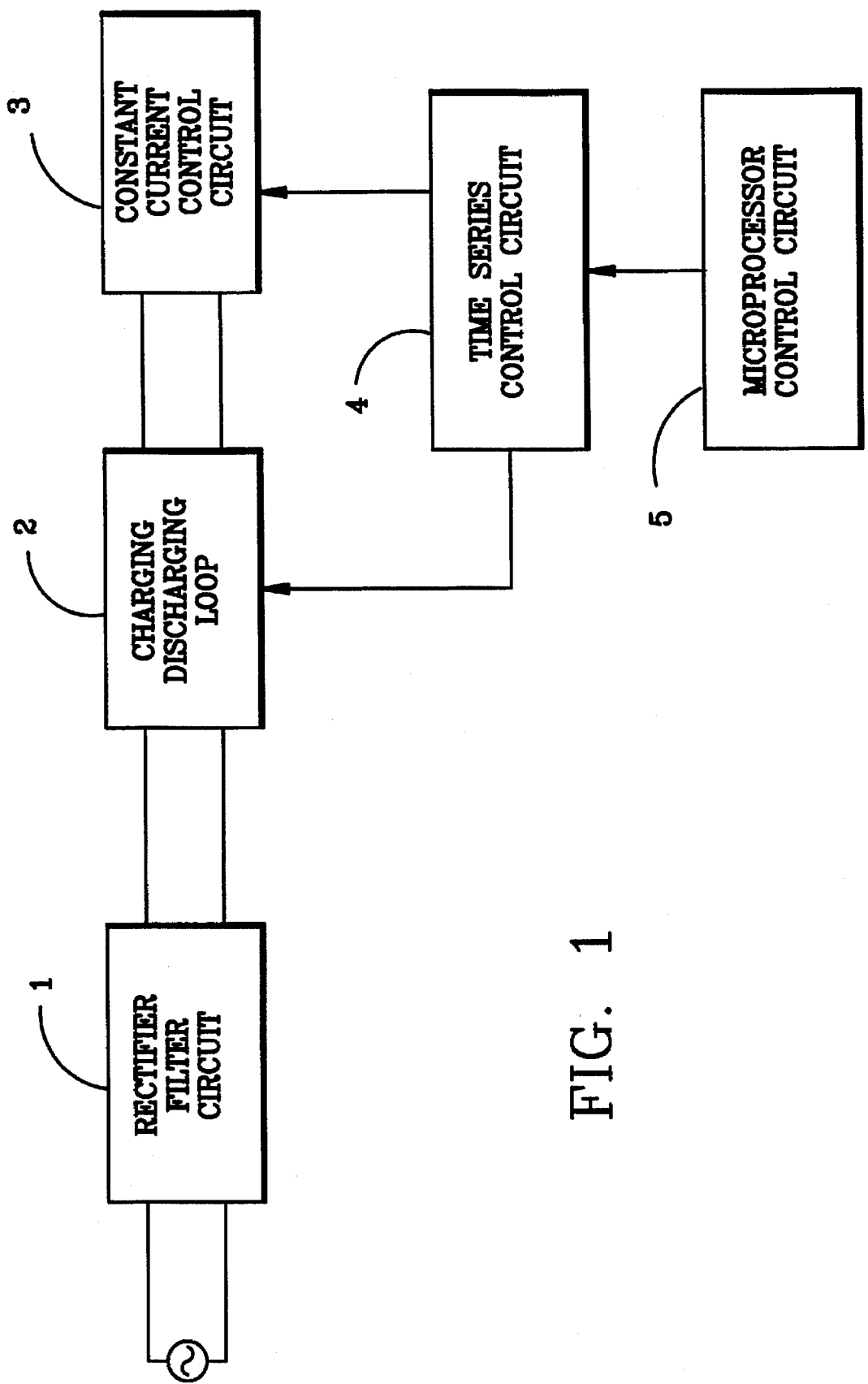
FIG. 1 is a circuit block diagram according to the present invention.

Referring to FIG. 1, a battery charging/discharging switching control protective circuit in accordance with the present invention is generally comprised of a rectifier filter circuit 1, a charging discharging loop 2, a constant current control circuit 3, a time series control circuit 4, and a microprocessor control circuit 5.

Figure 2:
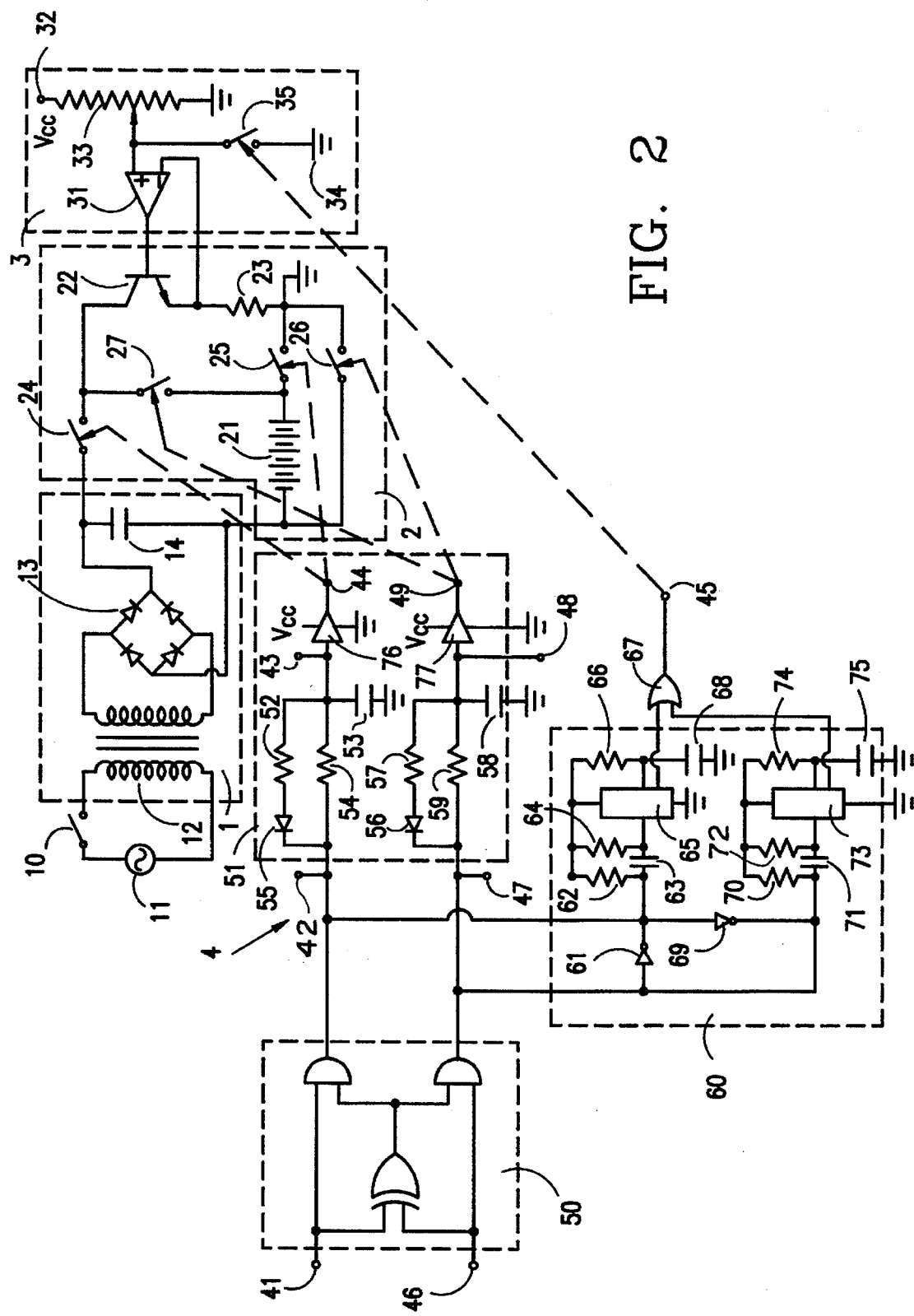
FIG. 2 is a circuit diagram showing the connection among the rectifier filter circuit, the charging discharging loop, the constant current control circuit, and the time series control circuit.

Referring to FIG. 2 and FIG. 1 again, the rectifier filter circuit 1 comprises a transformer 12, a bridge rectifier 13, and a filter capacitor 14. The input terminal of the transformer 12 is connected to AC power supply 11 through a switch 10. The output terminal of the transformer 12 is connected to the input terminal of the bridge rectifier 13. The output terminal of the bridge rectifier 13 is connected to the input terminal of the charge discharging loop 2 through the filter capacitor 14. When the switch 10 is switched on, AC power supply 11 is dropped, rectified and filtrated through the transformer 12, the bridge rectifier 13 and the filter capacitor respectively to provide a stable DC working voltage to the charging discharging loop 2, the constant current control circuit 3, and the time series control circuit 4. The charging discharging loop 2 is comprised of a transistor 22, a constant current resistor 23, a first switch 24, a second switch 25, a third switch 27, a fourth switch 26, and a charging discharging battery set 21. The base of the transistor 22 is connected to the output terminal of the constant current control circuit 3. The constant current control resistor 23 has one end connected to the emitter of the transistor 22, and an opposite end connected to ground. The collector of the transistor 22 is respectively connected to the normal open contact of the first switch 24 and the common contact of the third switch 27, and bridged to the normal close contact of the third switch 27. The normal close contact of the first switch 24 is bridged to its common contact, and connected to the output terminal of the rectifier filter circuit 1. The normal open contact of the third switch 27 is connected to the positive terminal of the charging discharging battery set 21. The positive terminal of the charging discharging battery set 21 is also connected to the common contact of the second switch 25 and bridged to its normal close contact. The normal open contact of the second switch 25 is respectively connected to ground and the normal open contact of the fourth switch 26. The negative terminal of the charging discharging battery set 21 is respectively connected to the internal circuit of the rectifier filter circuit 1 and the common contact of the fourth switch 26 and bridged to the normal close contact of the fourth switch 26. The normal close contacts of the switches 24, 25, 26 and 27 are respectively connected to the output terminal of the time series control circuit 4. The charging discharging loop 2 is controlled by the time series pulse signal from the time series control circuit 4, and driven by the constant current control circuit 3 to charge or discharge the charging discharging battery set 21.

Figure 3:
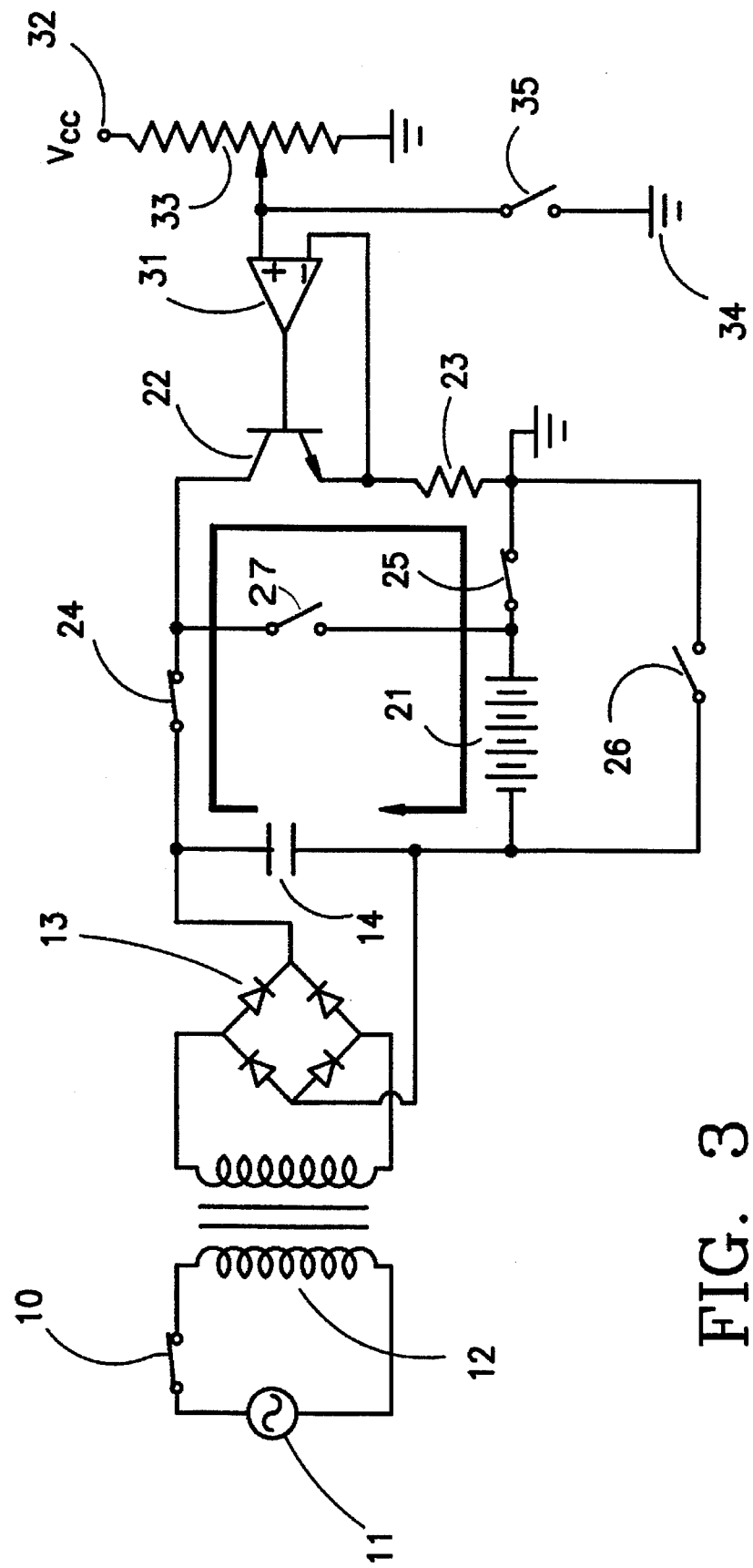
FIG. 3 is a circuit diagram of the charging discharging loop when at the charging mode.

When the switches 24 and 25 are switched on, the switches 26 and 27 are switched off, and the transistor 22 is turned on by the constant current control circuit 3, the charging discharging loop 2 is turned into a charging loop to charge the charging discharging battery set 21 (see FIG. 3).

Figure 4:
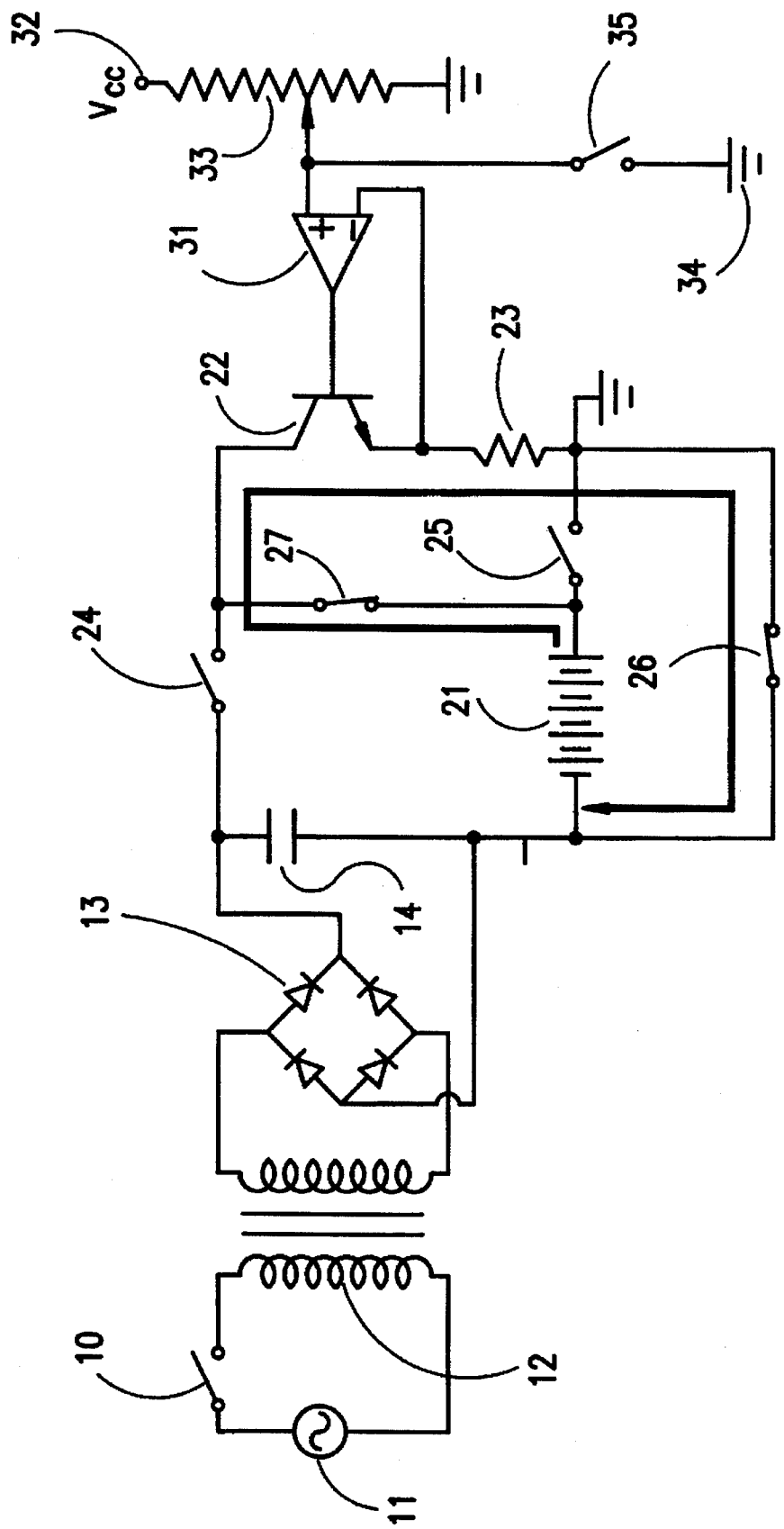
FIG. 4 is a circuit diagram of the charging discharging loop when at the discharging mode.

When the switches 24 and 25 are switched off, the switches 26 and 27 are switched on, and the transistor 22 is turned off by the constant current control circuit 3, the charging discharging loop 2 is turned into a discharging loop to discharge the charging discharging battery set 21 (see FIG. 4).

The constant current control circuit 3 comprises an operating amplifier 31, a variable resistor 33, and a charging discharging control switch 35. The non-inverter terminal of the operating amplifier 31 is connected to the variable resistor 33. The variable resistor 33 is connected to the output terminal of the time series control circuit 4 through the charging discharging control switch 35. The inverter terminal of the operating amplifier 31 is connected to the emitter of the transistor 22 of the charging discharging loop 2. The output terminal 31 of the operating amplifier 31 is connected to the base of the transistor 22 of the charging discharging loop 2. The charging discharging control switch 35 of the constant current control circuit 3 is controlled by the time series pulse signal from the times series control circuit 4 and adjusted by the variable resistor 32 to turn on/off the transistor 22 of the charging discharging loop 2 subject to predetermined value of charging or discharging current.

The time series control circuit 4 is comprised of an exclusive circuit 50, an integrating circuit 51, and a single-shot delay circuit 53. The circuit 4 further comprises charging signal terminals 41, 42, 43, and 44, a stop current signal terminal 45, discharging signal terminals 46, 47, 48, and 49, and an OR gate 67. The two input ends of the exclusive circuit 50 are connected to the microprocessor control circuit 5 to receive its time series pulse signal and to process the time series pulse signal for providing an output signal to the integrating circuit 51 and the single-shot delay circuit 53. The integrating circuit 51 is comprised of resistors 52, 54, 57, and 59, capacitors 53 and 58, diodes 55 and 56, and buffer circuits 76 and 77. The two input ends of the integrating circuit 51 are connected to the output terminal of the exclusive circuit 50. The two output ends of the integrating circuit 51 are respectively connected to the switches 24, 25, 26, and 27 of the charging discharging loop 2. The integrating circuit 51 receives the signal from the exclusive circuit 50, then integrates and delays the selected signal for providing an output signal for switching on/off the switches 24, 25, 26, and 27 of the charging discharging loop 2. The single-shot delay circuit 60 is comprised of single-shot ICs 65 and 73, resistors 62, 64, 66, 70, 72, and 74, capacitors 63, 68, 71, and 75, inverters 61 and 62. The input terminal of the single-shot delay circuit 60 is connected to the output terminal of the exclusive circuit 50. The output terminal of the single-shot delay circuit 60 is connected to the charging discharging control switch 35 of the constant current control circuit 3 through an OR gate 67. The single-shot delay circuit 60 receives the triggering signal from the exclusive circuit 50 and delays the signal for providing an output signal to the OR gate 67 for switching on/off the charging discharging control switch 35.

Figure 5:
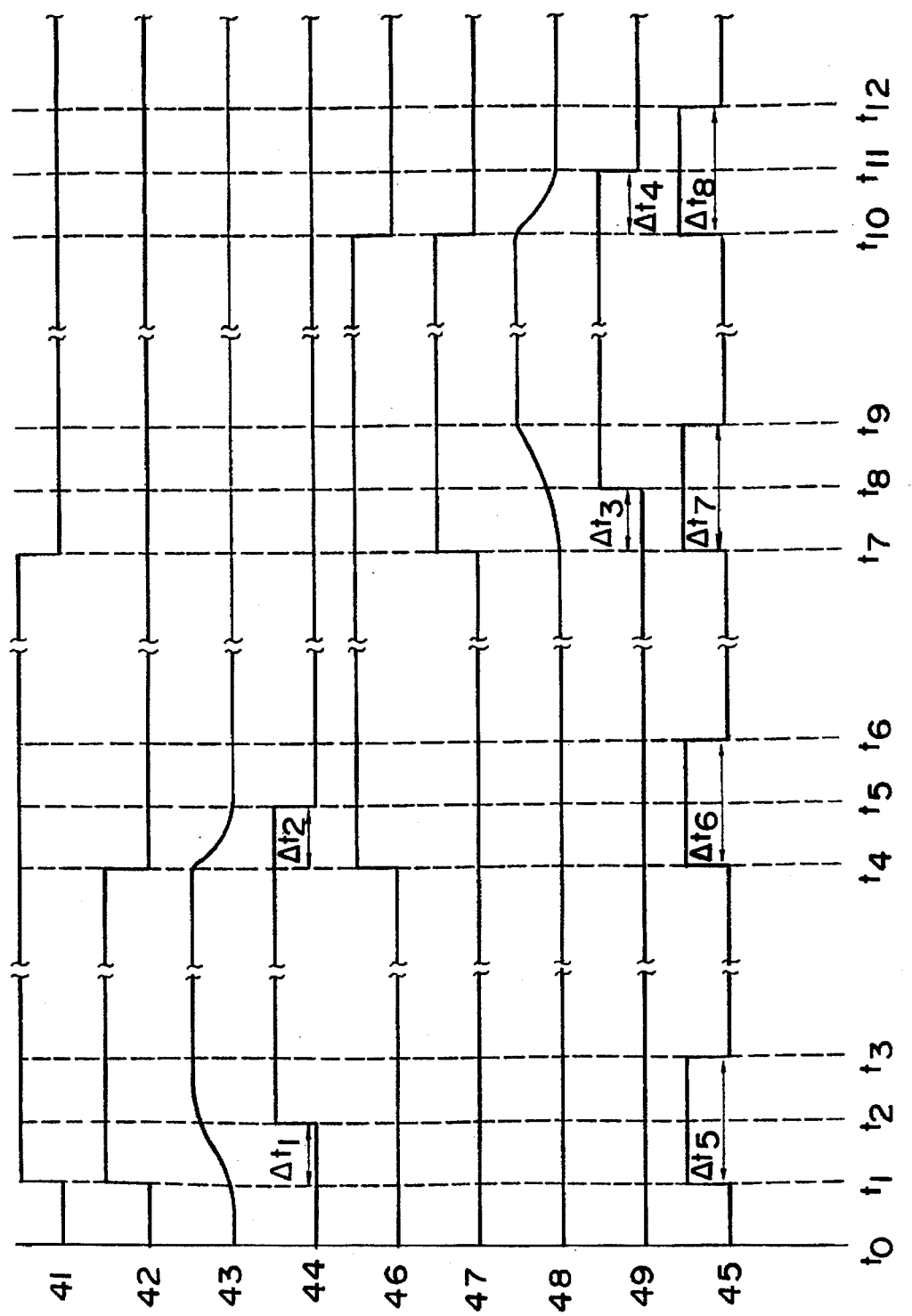
FIG. 5 is a time series chart showing the wave form change of the time series control circuit.

Referring to FIG. 5 and FIG. 2 again, when at time t1, the two input ends of the time series control circuit 4 receive the output signal from the microprocessor control circuit 5, causing the stop current signal 45 of the time series control circuit 4 to immediately drive the charging discharging control switch 35 of the constant current control circuit 3 in turning off the transistor 22. After $\Delta t1$, the charging signal 44 of the time series control circuit 4 turns on the switches 24 and 25, causing them to complete a switching operation within time t2 when no electric current passes through the respective contacts. This "non-current switching operation" prevents the occurrence of an electric arc, sparks, transient current or transient voltage. When at time t1, the charging signal terminal 41 receives a H signal, the discharging signal terminal 46 receives a L signal, therefore it is ready to charge the battery at time t1. When the H and L signals are simultaneously transmitted to the exclusive circuit 50, the charging signal 42 becomes H, the discharging signal 47 becomes L. The H charging signal 42 is integrated by the circuit of the resistor 54 and the capacitor 53, causing the potential of the charging signal 43 reaching ½ Vcc at time t2, which potential is transmitted through the buffer 76 to change the charging signal 44 from L to H, therefore from t1 to t2, there is a delay time $\Delta t1$.

When at time t1, charging signal 41 is H and sent through the exclusive circuit 50 to turn the charging signal 42 to H, causing the single-shot delay IC 73 to output a H signal, which H signal is $\Delta t5$ from t1 to t3 that is determined subject to the resistor 74 and the capacitor 75, wherein $\Delta t5 > \Delta t1$. This H signal is then sent through the OR gate 67 to turn the stop current signal 45 to H, causing each switch, which is controlled by the charging signal 44, to complete a switching operation when no electric current passes (no load). Therefore, a safety switching is guaranteed.

When the aforesaid time $\Delta t5$ terminates at t3, stop current signal 45 is turned from H to L, therefore the transistor 22 is turned on, causing the charging discharging battery set 21 of the charging discharging loop 2 to start the charging operation. During the charging mode, the volume of electric current is controlled by the operating amplifier 31 and the resistor 33 of the constant current control circuit 3, which permit only a predetermined value of electric current to charge the charging discharging battery set 21. Therefore, the charging discharging control circuit 3 can protect the charging discharging battery set 21. Similar battery protection procedure is performed at times from t4 to t6, t7 to t9, and t10 to t12.

When at time t4 during the period from t4 to t6, the discharging signal terminal 46 receives a H signal. At this stage, the charging signal 41 is still at H. When both H signals 41 and 46 are sent to the exclusive circuit 50, the output charging signal 42 is turned from H to L, however the discharging signal 47 is still at L. When the charging signal 42 is turned from H to L, the single-shot delay IC 65 is triggered, causing the stop current signal terminal 45 to provide a signal to the transistor 22 to further cut off the charging discharging loop 2, therefore electric current is stopped from the load. When at t5 after $\Delta t2$ (during the period from t4 to t6), charging signal 44 is turned from H to L within $\Delta t6$, which time is determined subject to resistors 52, 53, 54, and 55. Therefore, the switches 24 and 25 are switched off when no electric current passes.

The charging signal 41 is turned from H to L at t7. At the same time, the discharging signal 46 is still maintained at H. When both H signals 41 and 46 are sent to the exclusive circuit 50, the output discharging signal 47 is turned from L to H. The discharging signal 48 from the discharging signal 47 is integrated by the circuit of the resistor 59 and the capacitor 58, to provide an integrating circuit from L to H within the period from t7 to t9. When the discharging signal 48 reaches ½Vcc within this time period, it triggers the buffer 77 to turn the discharging signal 49 from L to H, to further produce a $\Delta t3$ time delay between the discharging signal 47 and the charging signal 49. This delay time $\Delta t3$ is determined subject to the resistor 59 and the capacitor 58. When at t7, the discharging signal 47 is turned from L to H, causing the single-shot delay IC 65 to provide a signal of pulse time $\Delta t7$. This pulse signal is sent through the OR gate 67 to provide a $\Delta t7$ time signal through the stop current signal terminal 45. When $\Delta t7$ stop current 45 begins at time t8, the discharging signal 49 is turned from L to H, to turn off the transistor 22, causing the switches 27 and 26 to turn on the discharging loop when no electric current passes through the load. Therefore, the switches are protected.

When $\Delta t7$ terminates at t9, the stop current signal 45 is turned from H to L, causing the transistor 22 to turn on the discharging loop, therefore the charging discharging battery set 21 starts to discharge. The value of discharged electric current is controlled by the operating amplifier 31 and the resistor 33 of the constant current control circuit 3, which permit only a predetermined value of electric current to pass. Therefore, the operation of the discharging loop is protected.

When at t10, the discharging signal 46 is turned from H to L, causing the discharging signal 47 turned from H to L. The discharging signal 48 is controlled by the circuit consisting of the diode 56, the resistors 57 and 59, and the capacitor 58. When discharging voltage is lower than ½Vcc, the discharging signal 48 is turned from H to L at t11, causing the switches 27 and 28 to trip off. Because the discharging signal 47 is turned from H to L at t10, the single-shot delay IC 73 is triggered to produce a $\Delta t8$ pulse, whose time is from t10 to t12. The pulse is sent through the OR gate 67 to the stop current signal 45, causing it to provide a $\Delta t8$ pulse, whose time is determined subject to the resistor 74 and the capacitor 75. The stop current signal 45 controls the switch 35 to turn off the transistor 22 within the time period from t10 to t12, and to turn off the switches 27 and 26 at t11. Therefore, the switches 27 and 26 are switched off when no electric current passes. When at t12, the stop current signal 45 turns on the transistor 22 again.

As indicated above, the present invention is to provide a battery charging/discharging switching control protective circuit in which, the charging loop 2 comprises a transistor 22 controlled by the posterior constant current control circuit 3; when the switch 35 of the constant current control circuit 3 is turned on, a rated current of low voltage (0.1V) is sent to the base of the transistor 22, causing a current of high voltage transmitted from the collector to the emitter for charging or discharging; when the switch 35 is turned off, the base of the transistor 22 receives no electric current, causing the collector and the emitter turned off. When there is no electric current passing through the charging discharging loop 2, the time series control circuit 4 controls the operation of the switches 24, 25, 26, and 27 of the charging discharging circuit 2 so as to achieve the switching between the charging mode and the discharging mode. Because no electric current passes, no electric arc, sparks, transient voltage will be produced at the respective contacts during the switching operation of the switches 24, 25, 26, and 27.

The switches 24, 25, 26, and 27 of the charging discharging loop 2 and the switch 35 of the constant current control circuit 4 are controlled by the time series control circuit 4, which is comprised of an exclusive circuit 50, an integrating circuit 51, a single-shot delay circuit 60, and an OR gate 67. When the charging signal, referenced by 41, is turned to H and the discharging signal, referenced by 46, is turned to L, the signal at 42 is H, the signal at 47 is L, and the OR gate 67 immediately provides a high potential stop current signal 45 to turn off the switch 35 of the constant current control circuit 3 when the single-shot delay circuit 60 receives the signal. When the charging signal 42 reaches 43, it is immediately integrated by the integrating circuit (52, 53, 54, and 55) to produce a delay time $\Delta t1$, and then sent to the buffer 76, causing the buffer 76 to provide a charging signal 44 for turning on the switches 24 and 25 of the discharging discharging loop 2. Because of the effect of the charging signal 42 and the operation of the single-shot delay IC, the aforesaid stop current signal 45 is automatically turned to L after $\Delta t5$, causing the transistor 22 of the charging discharging loop 2 turned on again.

Similarly, when the charging signal, referenced by 41 is turned to L and the charging signal, referenced by 46, is turned to H, the output signal from 47 is H and the output signal from 42 is L. When the signals are transmitted to the single-shot delay circuit 60, the OR gate 67 is triggered to produce a high potential stop current signal 45 to cut off electric current from the charging discharging loop 2. After a $\Delta t3$ time delay, the buffer 77 provides a discharging signal 49 to turn on the switches 26 and 27 of the charging discharging loop 2. The stop current signal 45 is automatically turned to L after time delay $\Delta t7$, causing the transistor 22 of the charging discharging loop 2 turned on again.

Furthermore, when 41 and 46 are simultaneously turned to H (or L), the output signals from 42 and 47 are L (or H). When the signals are transmitted to the single-shot delay circuit 60, the OR gate 67 is triggered to provide a high potential stop current signal 45 to cut off electric current from the charging discharging loop 2. After $\Delta t6$ ($\Delta t8$), the signal is automatically turned to L, causing the transistor 22 of the charging discharging loop 2 turned on again. Because of the effect of the integrating circuit 51, the charging signal 44 (or discharging signal 49) are turned to L after the time period $\Delta t2$ ($\Delta t4$) after 41 and 46 receive a signal input, causing the switches 24 and 25 (26 and 27) of the charging discharging loop 2 turned off.

As indicated, the switch 35 of the constant current control circuit 3 which controls the transistor, is turned off to stop electric current from passing through the respective contacts when the switches 24, 25, 26, and 27 of the charging discharging loop 2 are operating, therefore the battery charging and discharging circuit is protected.

I claim:

1. A battery charging/discharging switching control protective circuit comprising:

a rectifier filter circuit to provide the battery charging/discharging switching control protective circuit with a necessary working voltage;

a microprocessor control circuit to provide a first time series pulse signal and a second time series pulse signal;

a time series control circuit to receive and process the first and second time series pulse signals from said microprocessor control circuit so as to provide a third time series pulse signal, a fourth time series pulse signal, and a fifth time series pulse signal;

a constant current control circuit controlled by the third time series pulse signal from said time series control circuit to set the value of charging or discharging current through a variable resistor thereof by controlling an electronic switching element based on a constant current set by said control circuit; and a charging discharging loop controlled by the fourth and fifth time series pulse signals from said time series control circuit and electric current from said constant current control circuit to charge and discharge a charging discharging battery set, wherein the fourth and fifth time series pulse signals cause switches in said charging discharging loop to close before said electronic switching element is switched on by said constant current to complete said charging discharging circuit.

2. The battery charging/discharging switching control protective circuit of claim 1 wherein said charging discharging loop comprises:

a transistor having a base connected to the output terminal of said constant current control circuit, and an emitter connected to one end of a constant current resistor, an opposite end of said constant current resistor being connected to ground;

a first charging switch having a normally open contact connected to a collector of said transistor, a normally closed contact and a common contact bridged to each other and connected to one output end of said rectifier filter circuit;

a battery set having a negative terminal connected to another input end of said rectifier filter circuit;

a second charging switch having a common contact connected to a positive terminal of said battery set, a normally closed contact connected to ground;

a first discharging switch having a common contact connected to the collector of said transistor, a normally closed contact bridged to the common contact, and normally open contact connected to the positive terminal of said battery set;

a second discharging switch having a common contact connected to the negative terminal of said battery set, a normally closed contact bridged to the common contact, and a normally open contact connected to ground;

said charging switches or said discharging switches being maintained in a normally closed mode to form a charging or discharging loop to discharge electric current to said transistor when said charging discharging loop receives the third and fourth time series pulse signals from said time series control circuit and is driven by said constant current control circuit.

3. The battery charging/discharging switching control protective circuit of claim 2 wherein said charging switches and said discharging switches are relay switches.

4. The battery charging/discharging switching control protective circuit of claim 1 wherein said constant current control circuit comprises:

an amplifier having an output terminal to said charging/discharging loop, and an input terminal connected to said variable resistor to set the value of charging/discharging current; and a charging discharging control switch having a common contact connected to the input terminal of said amplifier, a normally closed contact bridged to the common contact, and a normally closed contact connected to ground, said charging discharging control switch being controlled by the third time series pulse signal to drive said charging discharging loop through said amplifier.

5. The battery charging/discharging switching control protective circuit of claim 1 wherein said time series control circuit comprises:

a logic circuit having two input ends respectively connected to said microprocessor control circuit to receive the first and second time series pulse signals from said microprocessor control circuit and to compare the signals;

a plurality of integrating circuits to receive the output signals from said logic circuit and to integrate and delay the signals; and a plurality of delay circuits to receive the output signal from said logic circuit and process the signal into a pulse signal for output through a logic gate.

6. The battery charging/discharging switching control protective circuit of claim 5 wherein said delay circuits are single-shot delay circuits.

7. The battery charging/discharging switching control protective circuit of claim 6 wherein said logic circuit is an exclusive circuit.

* * * * *